(12) United States Patent
Ishiyama et al.

(10) Patent No.: US 7,215,401 B2
(45) Date of Patent: May 8, 2007

(54) LIQUID CRYSTAL DISPLAY DEVICE

(75) Inventors: Toshiaki Ishiyama, Tokyo (JP);
Takahiko Watanabe, Tokyo (JP);
Shinya Ikeda, Tokyo (JP); Kazutoshi Takahashi, Tokyo (JP); Kosei Miyabe, Tokyo (JP); Kanetaka Sekiguchi, Tokyo (JP); Takakazu Yano, Tokyo (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 98 days.

(21) Appl. No.: 10/412,706

(22) Filed: Apr. 11, 2003

(65) Prior Publication Data
US 2004/0008293 A1    Jan. 15, 2004

(30) Foreign Application Priority Data
Apr. 12, 2002 (JP) ............................ 2002-110552

(51) Int. Cl.
G02F 1/1343    (2006.01)
G02F 1/1333    (2006.01)

(52) U.S. Cl. .................. 349/143; 349/138; 349/142

(58) Field of Classification Search ........ 349/138–139, 349/142–143
See application file for complete search history.

(56) References Cited

U.S. PATENT DOCUMENTS

| 4,224,617 A | * | 9/1980 | Stein ........................ 345/53 |
| 5,726,720 A | * | 3/1998 | Watanabe et al. ............. 349/43 |
| 6,218,206 B1 | | 4/2001 | Inoue et al. |
| 6,236,443 B1 | * | 5/2001 | Carlsen ...................... 349/143 |
| 6,774,970 B1 | * | 8/2004 | Sekiguchi ................... 349/142 |

FOREIGN PATENT DOCUMENTS

| JP | 8-320675 | | 12/1996 |
| JP | 10-207438 | | 8/1998 |
| JP | 11-101992 | | 4/1999 |
| JP | 11-202282 | | 7/1999 |
| JP | 11-258630 | * | 9/1999 |
| JP | 2000-098364 | | 4/2000 |
| JP | 2000-187209 | | 7/2000 |
| JP | 2000-193994 | * | 7/2000 |
| JP | 2001-330827 | | 11/2001 |
| JP | 2001-350151 | | 12/2001 |
| JP | 2001-356319 | | 12/2001 |
| JP | 2002-006787 | | 1/2002 |

* cited by examiner

Primary Examiner—Dung T. Nguyen
(74) Attorney, Agent, or Firm—Muirhead & Saturnelli, LLC

(57) ABSTRACT

A liquid crystal display has a first substrate formed with a picture character pixel electrode for displaying a picture character represented by a fixed pattern, a second substrate formed with a common electrode opposite to the picture character pixel electrode, and a liquid crystal layer sandwiched between the first substrate and the second substrate. The picture character pixel electrode is formed on an interlayer insulating film, and is connected to a picture character signal electrode formed below the interlayer insulating film through a plurality of contact holes formed through the interlayer insulating film.

31 Claims, 8 Drawing Sheets

LIQUID CRYSTAL DISPLAY DEVICE

BACKGROUND OF THE INVENTION

1. Field of the Invention

The present invention relates to a liquid crystal display device which has a picture character display area for displaying picture characters, each of which is represented by a fixed pattern.

2. Description of the Related Art

In portable electronic devices such as electronic notebooks, portable telephones and the like, display of picture characters, each represented by a fixed pattern, is becoming indispensable for informing the outside of a variety of device conditions such as power consumption of battery, occurrence of fault, and the like. Particularly, liquid crystal devices coming on the market in recent years have both a moving image display area which is actively driven and a picture character display area which is statically driven in order to reduce the cost and space.

Known liquid crystal display devices are generally classified into a reflection type which utilizes reflection of external light, incident from the outside, to display an image, a transmission type which transmits light emitted from a light source such as a back light to display an image, and a reflection/transmission combined type which transmits a portion of light from a light source and reflects a portion of external light.

Japanese Patent Laid-Open No. 350151/2001, for example, discloses a conventional reflection type liquid crystal display device which has a picture character display area. This liquid crystal display device comprises a light reflecting layer and a color filter layer laminated on a transparent substrate in order; a common electrode made of ITO (Indium Tin Oxide) disposed on the color filter layer for displaying picture characters; a data electrode disposed opposite to the common electrode across a liquid crystal layer for displaying picture characters, and a dummy pattern disposed around the data electrode.

On the other hand, Japanese Patent Laid-Open No. 202282/1999, for example, discloses a conventional transmission type liquid crystal display device which has a picture character display area. In this liquid crystal display device, a light shielding film formed on a transparent substrate is formed with openings each shaped in a desired picture character which is displayed by transmitting light from a backlight through the opening.

Further, Japanese Patent Laid-Open No. 330827/2000, for example, discloses a conventional reflection type liquid crystal display device which has a moving image display area. This liquid crystal display device comprises a thin-film transistor formed on a transparent substrate in an inverse stagger structure; an insulating film deposited to overlay the thin-film transistor; and a reflective electrode formed on the insulating film, where the thin-film transistor has a drain electrode connected to the reflective electrode through an opening formed through the insulating film.

In addition, Japanese Patent No. 2955277, for example, discloses a conventional reflection/transmission combined type liquid crystal display device which has a moving image display area. This liquid crystal display device comprises a thin-film transistor formed on a transparent substrate in an inverse stagger structure; an insulating film deposited to overlay the thin-film transistor; a transparent electrode formed on the insulating film; a transparent conductive film connected to a drain electrode of the thin-film transistor through an opening formed through the insulating film; and a reflective area formed of a metal film on the transparent conductive film over the thin-film transistor and opening area.

In the conventional liquid crystal display device having a picture character display area, a picture character pixel electrode in the shape of a picture character comprised of a fixed pattern is formed in the same layer as a signal electrode for supplying a signal to the picture character pixel electrode, as in the liquid crystal display device described in the aforementioned Japanese Patent Laid-Open No. 350151/2001. Such a configuration implies a problem of a degraded display quality because wires are readily visible.

To solve this problem, it is contemplated that the picture character pixel electrode is formed in a layer different from a layer in which the signal electrode is formed. In this structure, when a contact is formed in an imperceptible size for connecting the picture character pixel electrode to the signal electrode, the inductance and resistance increase at the contact, possibly increasing distortions in signal waveform and a voltage drop. Since the liquid crystal display device is basically driven with an alternating current, the liquid crystal display device cannot display images in response even at a relatively low signal frequency as distortions in signal waveform and voltage drop are increased due to increased inductance and resistance, giving rise to a problem of a degraded display quality.

SUMMARY OF THE INVENTION

It is therefore an object of the present invention to provide a liquid crystal display device having a picture character display area which is capable of displaying picture characters in high quality.

To achieve the above object, a liquid crystal display device according to the present invention has a first substrate formed with a picture character pixel electrode for displaying a picture character represented by a fixed pattern, a second substrate formed with a common electrode opposite to the picture character pixel electrode, and a liquid crystal layer sandwiched between the first substrate and the second substrate. The picture character pixel electrode is formed on an interlayer insulating film, and is connected to a picture character signal electrode formed below the interlayer insulating film through a plurality of contact holes formed through the interlayer insulating film. In the configuration as described, a connection resistance and inductance are reduced at contacts to suppress distortions in signal waveform and a voltage drop, thereby improving the quality of display on the picture character display window.

Also, in the present invention, the first contact holes are formed to have a size which is not visible to a human, thereby preventing a degradation in display quality.

The liquid crystal display device further includes a background pixel electrode formed to surround the periphery of the picture character pixel electrode for displaying a background, so that the picture character display window provides more attractive picture characters. Particularly, when the picture character display window normally displays in white (displays the screen in white when a signal is OFF), the picture character display window can display a picture character in white and the background in black to improve the contrast of an image represented thereon.

Another liquid crystal display device according to the present invention has a first substrate formed with a picture character pixel electrode for displaying a picture character represented by a fixed pattern, a second substrate formed with a common electrode opposite to the picture character pixel electrode, and a liquid crystal layer sandwiched between the first substrate and the second substrate. The first substrate includes a plurality of matrix pixel electrodes arranged on the interlayer insulating film in a lattice pattern for displaying a desired image, second contact holes formed through the interlayer insulating film, and a matrix signal electrode formed below the interlayer insulating film and connected to the matrix pixel electrode through the second contact holes, and having one end connected to a thin film transistor.

In the configuration as described above, since the matrix display window is substantially equal in laminate structure to the picture character display window, they can be manufactured in the same process, thereby reducing the manufacturing cost. Particularly, when the matrix display window and picture character display window are manufactured in the same laminate structure, these display units can be formed with the same reflective electrodes and contact holes which have the same diameter and are arranged at the same pitch. It is therefore possible to match the display units in transmission optical characteristics and reflection optical characteristics to provide the same display quality both on the picture character display window and matrix display window.

Also, in the present invention, color filters are arranged in stripe geometry in an area of the second substrate opposite to the matrix pixel electrode, and color filters are arranged in delta, stripe or mosaic geometry in an area of the second substrate opposite to the picture character pixel electrode. In the configuration as described above, uniform color tone can be provided in the matrix display window for color display as well as in the picture character display window for monochrome display. Particularly, the color filters arranged in the area opposite to the matrix pixel electrode have a vertical and a horizontal cell pitch, at least one of which is longer than a corresponding cell pitch of the color filters arranged in the area opposite to the picture character pixel electrode, resulting in an improved display quality when oblique lines are displayed on the picture character display window.

Also, the thin film transistor is driven by a scanning signal supplied to the gate electrode and a data signal supplied to the drain electrode. The scanning signal is deactivated in a power save mode to stop a display through the matrix display window. In the configuration as described above, the power consumption can be reduced in the liquid crystal display device.

Further, the picture character signal electrode is formed in the same layer as the source electrode of the thin film transistor, which serves as the matrix signal electrode, in a display area, and formed in the same layer as the gate electrode of the thin film transistor in a non-display area. In the configuration as described above, when an Au ball is disposed in a seal for supplying a predetermined voltage to the common electrode formed on the second substrate, the insulating property can be improved between the picture character signal electrode and Au ball in the non-display area, to prevent a failure in insulation.

The above and other objects, features, and advantages of the present invention will become apparent from the following description with reference to the accompanying drawings, which illustrate examples of the present invention.

DETAILED DESCRIPTION OF THE EMBODIMENTS (First Embodiment)

Figure 1:
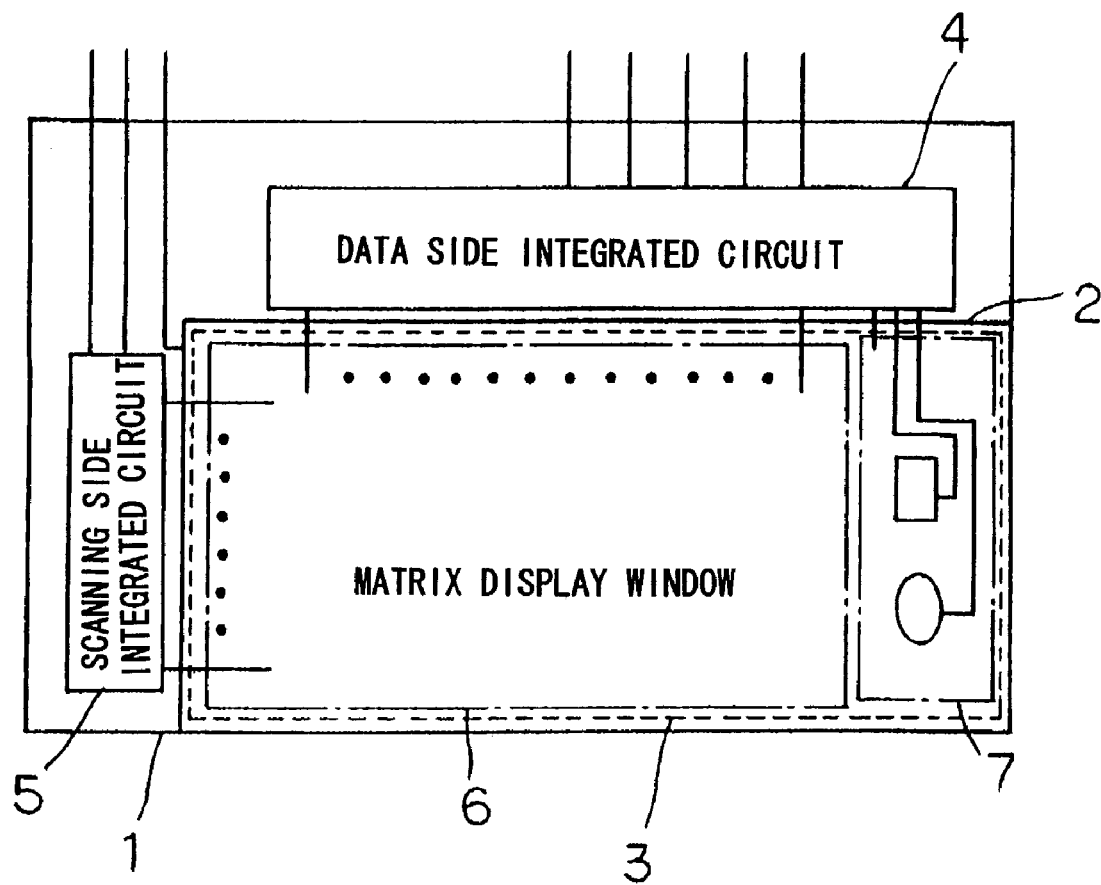
FIG. 1 is a top plan view illustrating an exemplary configuration of a liquid crystal display device according to the present invention.

FIG. 1 is a top plan view illustrating an exemplary configuration of a liquid crystal display according to the present invention.

As illustrated in FIG. 1, the liquid crystal display comprises element substrate 1 made of a transparent glass plate; common substrate 2 disposed opposite to element substrate 1; liquid crystal display element 3 formed by injecting liquid crystal between element substrate 1 and common substrate 2 for displaying an image; and data side integrated circuit 4 and scanning side integrated circuit 5 formed on element substrate 1 for supplying liquid crystal display element 3 with a signal for displaying a desired image on liquid crystal display element 3. Data side integrated circuit 4 and scanning side integrated circuit 5 are connected to a printed circuit board, not shown, which may be mounted with a signal generator circuit for generating a signal representative of a display image, a power supply circuit, and the like.

Liquid crystal display element 3 is comprised of matrix display window 6 which is an actively driven moving image display area, and picture character display window 7 which is a statically driven picture character display area. Matrix display window 6 is formed with a thin film transistor (TFT) in each of a plurality of pixel areas arranged in a lattice pattern. Picture character display window 7 in turn is formed with a plurality of picture character pixel electrodes, each of which is patterned with a picture character. Common substrate 2 is formed with a transparent common electrode over the entirety of matrix display window 6 and picture character display window 7.

Data side integrated circuit 4 supplies data signals in accordance with a display image to a drain electrode of each thin film transistor formed in matrix display window 6, and to each picture character pixel electrode formed in picture character display window 7, respectively. Scanning side integrated circuit 5 in turn supplies a scanning signal to a gate electrode of each thin film transistor formed in matrix display window 6. Each thin film transistor is driven by the scanning signal supplied to the gate electrode and the data signal supplied to the drain electrode. In a power save mode, the operation of scanning side integrated circuit 5 is brought to a halt to stop supplying the scanning signal, thereby stopping a display on matrix display window 6. In this event, the overall power consumption is reduced in the liquid crystal display device because data side integrated circuit 4 only needs to supply the data signal to picture character display window 7.

Next, the structure of the liquid crystal display device according to a first embodiment will be described with reference to the accompanying drawings.

The first embodiment shows an exemplary liquid crystal display device which employs a reflection type liquid crystal display element for picture character display window 7 illustrated in FIG. 1. The following description will be made on the reflection type liquid crystal display element, which constitutes picture character display window 7 of the present invention, in detail with reference to FIGS. 2A, 2B.

Figure 2A:
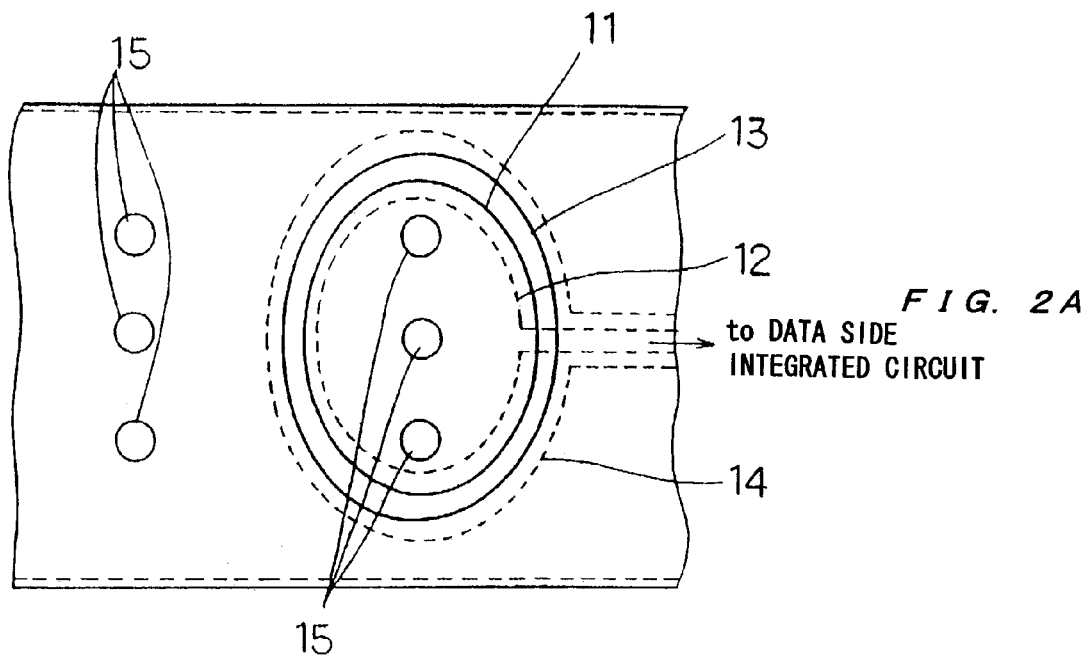
FIG. 2A is a top plan view illustrating the configuration of a picture character display window in a reflection type liquid crystal display device according to a first embodiment of the present invention.

As illustrated in FIG. 2A, picture character display window 7 in the first embodiment comprises picture character pixel electrode 11 formed on element substrate 1 and patterned with a picture character; picture character signal electrode 12 formed below picture character pixel electrode 11 across an insulating layer, not shown; background pixel electrode 13 formed to surround the periphery of picture character pixel electrode 11 for displaying a background; background signal electrode 14 formed below background pixel electrode 13 across an insulating layer, not shown; and contact holes 5 for connecting picture character pixel electrode 11 to picture character signal electrode 12 and background pixel electrode 13 to background signal electrode 14, respectively. Picture character signal electrode 12 and background signal electrode 14 serve as signal lines for connecting a contact hole in picture character pixel electrode 11 and a contact hole in background pixel electrode 13 to data side integrated circuit 4, respectively.

Picture character signal electrode 12 and background signal electrode 14 are covered with picture character pixel electrode 11, background pixel electrode 13 or a light shielding film (for example, a black matrix) except for a gap between picture character pixel electrode 11 and background pixel electrode 13. As illustrated in FIG. 1, since a plurality of pixel characters are arranged in the vertical direction in picture character display window 7, picture character signal electrode 12 is placed to the left and right of the location of each picture character pixel electrode 11, as viewed in FIG. 1. Also, the boundary between matrix display window 6 and picture character display window 7, and the right edge of picture character display window 7 shown in FIG. 1 are covered with light shielding films, respectively.

Figure 2B:
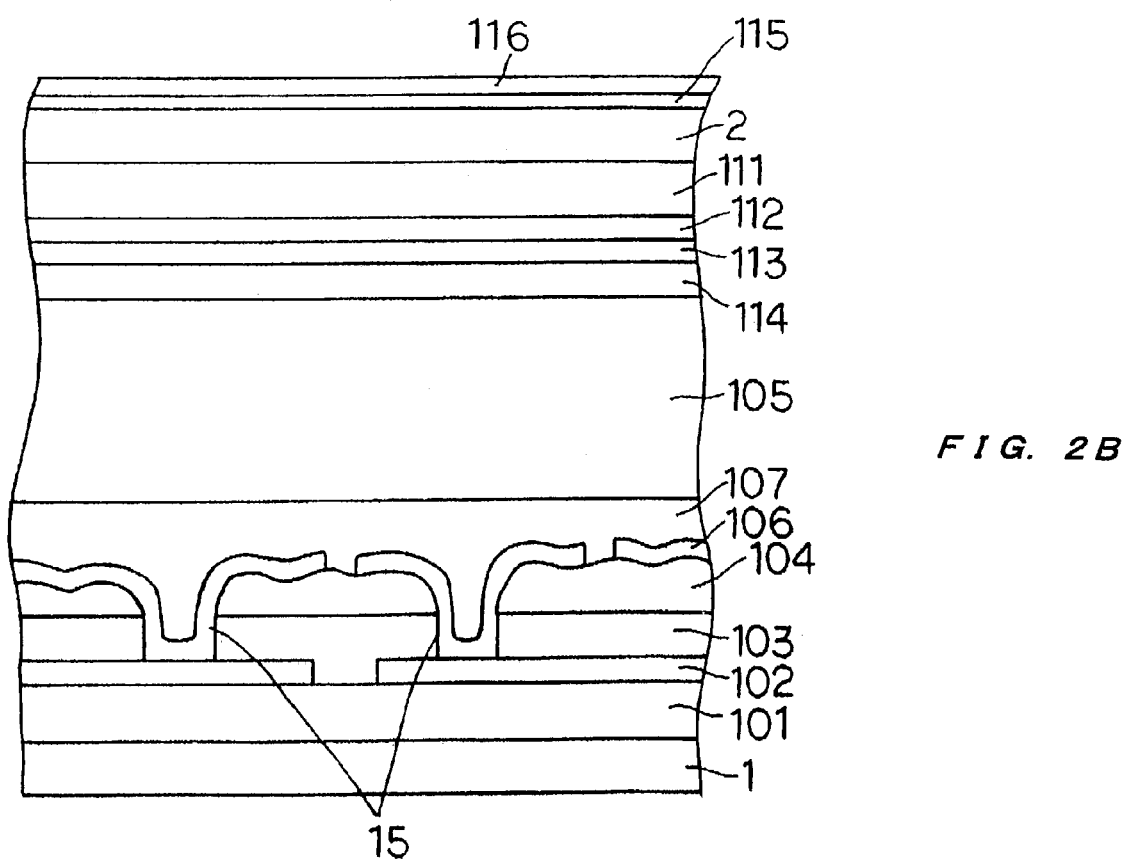
FIG. 2B is a cross-sectional view of the picture character display window illustrated in FIG. 2A.

As illustrated in FIG. 2B, insulating film 101 made of silicon nitride or the like is deposited on element substrate 1 of picture character display window 7, and signal electrode 102 made of chromium (Cr) or the like is formed on insulating film 101 for connection with data side integrated circuit 4. Signal electrode 102 is formed into picture character signal electrode 12 for supplying a data signal from data side integrated circuit 4 to picture character pixel electrode 11, and into background signal electrode 14 for supplying a data signal from data side integrated circuit 4 to background pixel electrode 13.

Signal electrode 102 is covered with interlayer insulating film 103 made of silicon nitride or the like, and rugged insulating film 104 is laminated on interlayer insulating film 103. Reflective electrode 106 is formed on rugged insulating film 104 for reflecting external light and for supplying a voltage to liquid crystal layer 105 sandwiched between element substrate 1 and common substrate 2. Reflective electrode 106 is formed into picture character pixel electrode 11 patterned with a picture character, and background pixel electrode 13 for displaying a background which is formed to surround the periphery of picture character pixel electrode 11. Reflective electrode 106 is formed with a rugged surface conformal with the surface shape of rugged insulating film 104, where the pitch, height and depth of ruggedness are respectively set to provide desired reflection optical characteristics.

Interlayer insulating film 103 and rugged insulating film 104 are formed with a plurality of contact holes 15 extending therethrough, such that signal electrode 102 is connected to reflective electrode 106 through contact holes 15. Alignment film 107 is formed on reflective electrode 106 for orienting liquid crystal molecules in contact with liquid crystal layer 105 in a predetermined direction.

On the other hand, on common substrate 2 which opposes element substrate 1 across liquid crystal layer 105, a laminate is comprised of color filters 111 for display in color; protection film 112 for protecting color film 111; common electrode 113 made of a transparent ITO (Indium Tin Oxide) film; and alignment film 114. These components are stacked in this order. In addition, phase difference plate 115 and polarizer plate 116 are laminated in order on the back of common substrate 2 opposite to liquid crystal layer 105.

FIG. 2 shows that picture character pixel electrode (reflective electrode) 11 is connected to picture character signal electrode (signal electrode) 12 through three contact holes 15, and background pixel electrode (reflective electrode) 13 is connected to background signal electrode (signal electrode) 14 through three contact holes 15. The number of contact holes 15, however, is not limited to three, but may be any number equal to or larger than two.

In picture character display window 7 in the first embodiment, picture character pixel electrode 11 is connected to picture character signal electrode 12 using a plurality of contact holes 15 arranged at predetermined intervals. Likewise, background pixel electrode 13 is connected to background signal electrode 14 using a plurality of contact holes 15 similarly arranged at predetermined intervals.

Since contact holes 15 cannot serve as reflective electrode 106 for reflecting external light due to their shape, each contact hole 15 is formed with a diameter viewed with difficulty by a human in the first embodiment.

Typically, contact holes 15 are each formed in the shape of a rectangle or a circle, the width of which refers to the longest one of distances between two opposing sides, viewed from the plane of the opening. Generally, humans have the visual acuity less than 2.0, and view characters and small picture characters at a distance of 20–50 cm. Since the visual acuity of 2.0 is defined as the ability to identify an object of 0.5' (1/120 degrees) at a visual angle, a human having the visual acuity of 2.0 can recognize an object having a size of:

200 mm×tan(1/120 degrees)=29 μm at a distance of 20 cm. In other words, contact holes 15 are formed to have a diameter of 29 μm or less in the first embodiment. It should be noted that contact holes 15 are preferably formed to have a large diameter to some degree in order to connect reflective electrode 106 to signal electrode 102 with a predetermined resistance or less. The inventors have confirmed that the liquid crystal display device operates without problem when it is provided with a plurality of square contact holes 15 having one side of 11 μm long.

Further, in the first embodiment, picture character signal electrode 12 and background signal electrode 14 are formed to have a width (29 μm or less) which cannot be viewed in a gap between picture character pixel electrode 11 and background pixel electrode 13.

Consequently, picture character display window 7 in the first embodiment has background pixel electrode 13 disposed around picture character pixel electrode 11, picture character pixel electrode 11 and picture character signal electrode 12 formed in different layers, and background pixel electrode 13 and background signal electrode 14 formed in different layers, so that picture character signal electrode 12 and background signal electrode 14 are covered with picture character pixel electrode 11, background pixel electrode 13 or a light shielding film except for the gap between picture character pixel electrode 11 and background pixel electrode 13. Moreover, picture character signal electrode 12 and background signal electrode 14 are formed to have a width (29 μm or less) which cannot be viewed in a gap between picture character pixel electrode 11 and background pixel electrode 13, thereby preventing a degradation in display quality.

In addition, picture character pixel electrode 11 is connected to picture character signal electrode 12 using a plurality of contact holes 15 to reduce a connection resistance and inductance at contacts and accordingly suppress distortions in signal waveform and a voltage drop, thereby improving the quality of display on picture character display window 7.

Furthermore, since the picture character pixel electrode can be surrounded by the picture character signal electrode by forming the picture character pixel electrode and background pixel electrode in different layers, the picture character display window provides more attractive picture characters. Particularly, when the picture character display window normally displays in white (displays the screen in white when a signal is OFF), the picture character display window displays a picture character in white and the background in black to improve the contrast of an image represented thereon.

(Second Embodiment)

A second embodiment shows an exemplary liquid crystal display device which employs a reflection/transmission combined type liquid crystal display element which partially transmits and partially reflects light for picture character display window 7 illustrated in FIG. 1. The following description will be made on the reflection/transmission combined type liquid crystal display element, which constitutes the picture character display window of the present invention, in detail with reference to FIGS. 3 and 4A to 4D.

Figure 3:
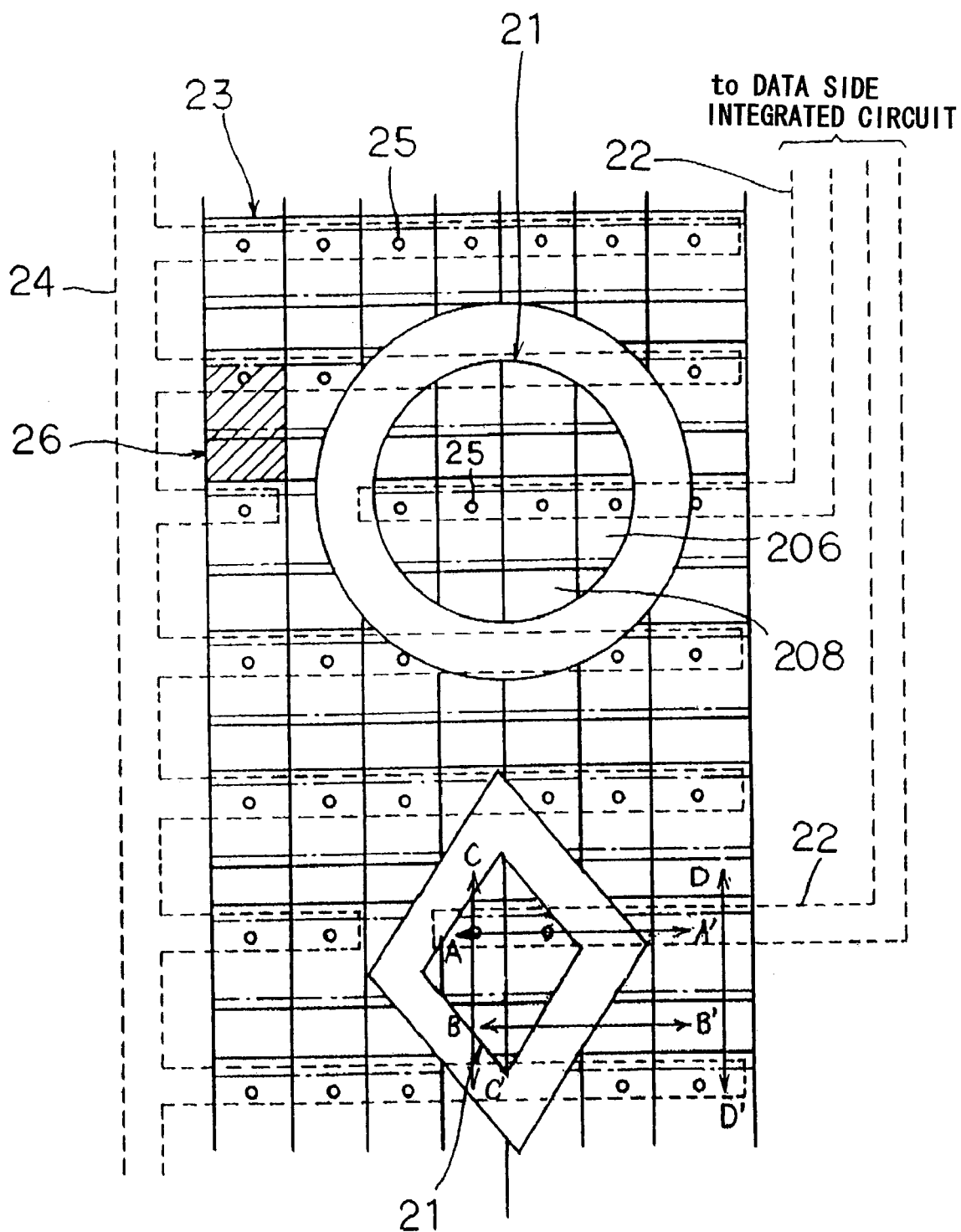
FIG. 3 is a top plan view illustrating the configuration of a picture character display window in a reflection/transmission combined type liquid crystal display element according to a second embodiment of the present invention.
Figure 4A:
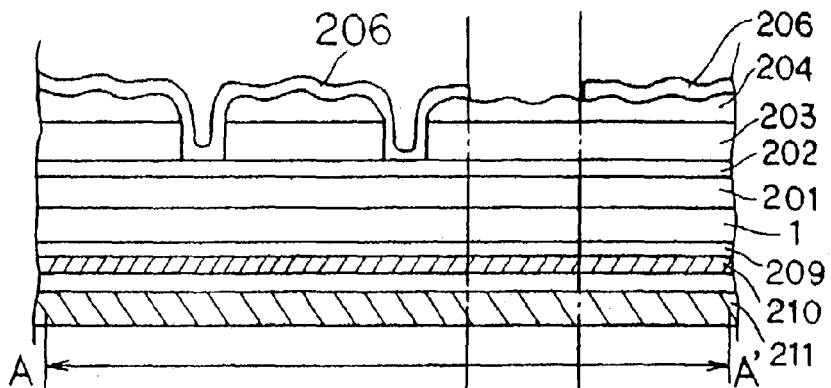
FIG. 4A is a cross-sectional view taken along a line A–A' illustrating the structure of the picture character display window illustrated in FIG. 3.
Figure 4B:
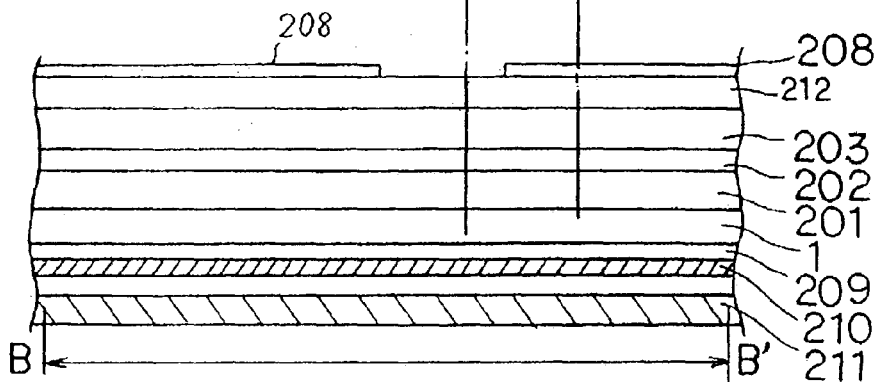
FIG. 4B is a cross-sectional view taken along a line B–B' illustrating the structure of the picture character display window illustrated in FIG. 3.
Figure 4C:
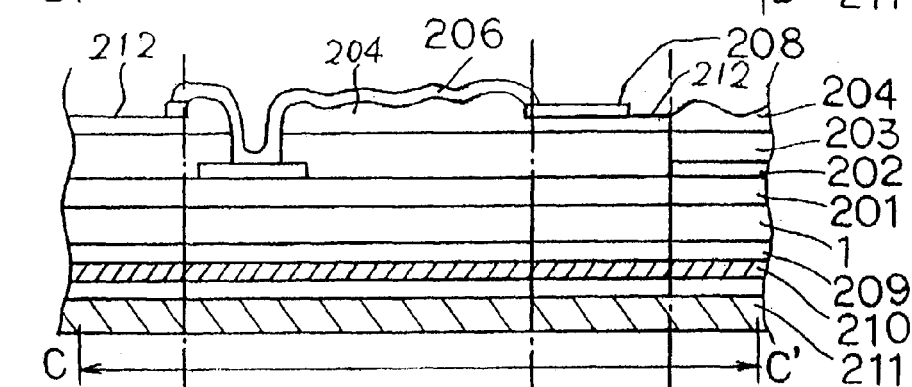
FIG. 4C is a cross-sectional view taken along a line C–C' illustrating the structure of the picture character display window illustrated in FIG. 3.
Figure 4D:
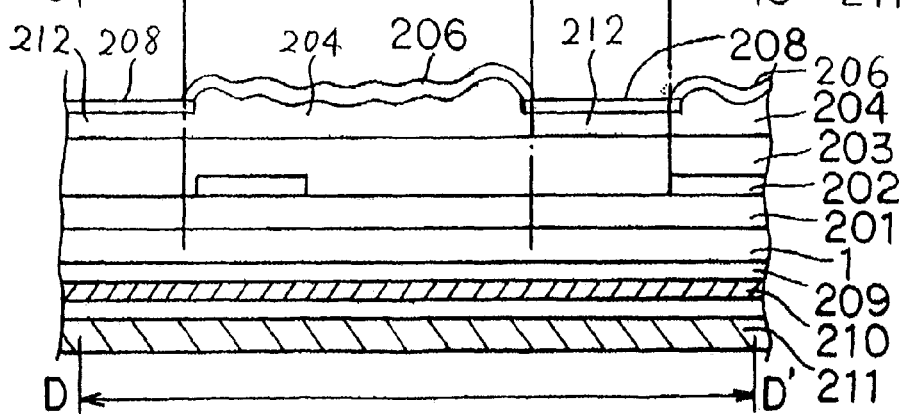
FIG. 4D is a cross-sectional view taken along a line D–D' illustrating the structure of the picture character display window illustrated in FIG. 3.

As illustrated in FIG. 3, the picture character display window in the second embodiment comprises picture character pixel electrode 21 patterned with a picture character; picture character signal electrode 22 formed below picture character pixel electrode 21 across an insulating layer, not shown; background pixel electrode 23 formed to surround the periphery of picture character pixel electrode 21 for displaying a background; background signal electrode 24 formed below background pixel electrode 23 across an insulating layer, not shown; and a plurality of contact holes 25 for connecting picture character pixel electrode 21 to picture character signal electrode 22 and background pixel electrode 23 to background signal electrode 24. These components are formed on element substrate 1. Picture character signal electrode 22 and background signal electrode 24 are each connected to data side integrated circuit 4.

The picture character display window in the second embodiment is comprised of a plurality of pixel areas 26 arranged in a lattice pattern, where each pixel area 26 is formed with reflective electrode 206 and transparent electrode 208 which is connected to reflective electrode 206 in the same layer. A signal electrode (picture character signal electrode 22 or background signal electrode 24) using chromium (Cr) is disposed below reflective electrode 206 which is connected to the signal electrode through a plurality of contact holes 25 formed in each pixel area 26.

Picture character pixel electrode 21 and background pixel electrode 23 are each formed of a plurality of pixel areas 26, and contact holes 25 are formed only at locations (available for the formation) spaced by a predetermined distance or more from the outer periphery of picture character pixel electrode 21 or background pixel electrode 23. Here, out of contact holes 25 disposed at regular intervals, actually formed are only those contact holes 25 which are completely included in picture character pixel electrode 21 or background pixel electrode 23.

Picture character signal electrode 22 and background signal electrode 24 are interdigitally arranged below reflective electrode 206 of each pixel area 26 in accordance with the shape of picture character pixel electrode 21. Also, portions of picture character signal electrode 22 and background signal electrode 24 located outside background pixel electrode 23 are each covered with a light shielding film.

As illustrated in FIGS. 4A to 4D, the picture character display window in the second embodiment is similar to the first embodiment in that insulating film 201, signal electrode 202, interlayer insulating layer 203 and rugged insulating film 204 are laminated on element substrate 1 in order, and that reflective electrode 206 is formed on rugged insulating layer 204. However, in a transmission area in which transparent electrode 208 is formed, flat insulating film 212 having a flat top face is formed on interlayer insulating film 203, and flat transparent electrode 208 is formed on flat insulating film 212. Generally, flat insulating film 212 is formed in a smaller thickness than rugged insulating film 204 in order to eliminate a difference in light path between a reflective area in which reflective electrode 206 is formed and the transmission area.

Alternatively, flat insulating film 212 may not be formed in the transmission area, and transparent electrode 208 may be formed directly on interlayer insulating film 203. In this structure, transparent electrode 208 may be formed on interlayer insulating film 203 both in the reflective area and transparent area; rugged insulating film 204 only in the reflective area; and reflective electrode 206 on rugged insulating film 204.

In addition, phase difference plate 209 and polarizer plate 210 are laminated in order on the back of element substrate 1 opposite to liquid crystal layer 205, and backlight 211 is disposed below polarizer plate 210. Since the remaining configuration is similar to that in the first embodiment, description thereon is omitted.

While an alignment film formed on reflective electrode 206 and transparent electrode 208, a liquid crystal layer, and respective layers formed on the common substrate are omitted in FIGS. 4A to 4D, similar layers to those in the first embodiment are actually formed on these components, respectively.

In the picture character display window in the second embodiment, background pixel electrode 23 is disposed around picture character pixel electrode 21, picture character pixel electrode 21 and picture character signal electrode 22 are formed in different layers, and background pixel electrode 23 and background signal electrode 24 are formed in different layers, so that picture character signal electrode 22 and background signal electrode 24 are covered with picture character pixel electrode 21, background pixel electrode 23 or a light shielding film except for a gap between picture character pixel electrode 21 and background pixel electrode 23, in a manner similar to the first embodiment. Further, picture character signal electrode 22 and background signal electrode 24 are formed to have a width which cannot be viewed in the gap between picture character pixel electrode 21 and background pixel electrode 23 to prevent a degradation in the quality of display. In addition, picture character pixel electrode 21 is connected to picture character signal electrode 22 using a plurality of contact holes 25 to reduce a connection resistance and inductance at contacts and accordingly suppress distortions in signal waveform and a voltage drop, thereby improving the quality of display on picture character display window 7.

Furthermore, since the picture character pixel electrode can be surrounded by the picture character signal electrode by forming the picture character pixel electrode and background pixel electrode in different layers in a manner similar to the first embodiment, the picture character display window provides more attractive picture characters.

The reflection/transmission combined type picture character display window in the second embodiment employs a translucent reflective electrode which partially transmits and partially reflects light. However, a reflective area is separated from a transparent (transmission) in macrostructure. Such structure is described, for example, in Japanese Patent No. 2955277. Alternatively, the translucent reflective electrode may be implemented by a so-called half mirror structure which has a reflective area and a transparent (transmission) area separated in microstructure. Such structure is described, for example, in Japanese Patent Laid-Open No. 098364/2000. In the structure which has the reflective area and transparent (transmission) area separated in macrostructure as illustrated in FIG. 3, the balance may be lost in display between the reflective area and transparent (transmission) area, when a picture character is displayed. When the reflective area differs from the transparent (transmission) area in subtle color taste or in viewing angle, these problems become easily apparent if the balance is lost in display between the reflective area and transparent (transmission) area. On the contrary, the balance will never be lost in display between the reflective area and transparent (transmission) area when they are separated in microstructure.

In the second embodiment which comprises picture character pixel electrode 21 and background pixel electrode 23 formed of the reflective electrode and transparent electrode, either the reflective electrode or the transparent electrode may be larger than the other, and contact holes 25 may be provided in any of the reflective electrode and transparent electrode. However, when the transparent electrode is provided with contact holes 25, the numerical aperture is lower if an opaque electrode (made of Cr or the like) is used for the signal electrode formed therebelow, so that the opaque electrode must be reduced in width as much as possible. On the other hand, when a transparent electrode is used for the signal electrode, the transparent electrode must be made wide because of its relatively large resistance, possibly resulting in a lower numerical aperture likewise. Therefore, in the configuration as illustrated in FIG. 3, it is preferred that contact holes 25 are formed through the reflective electrode which constitutes picture character pixel electrode 21 and background pixel electrode 23, and that an opaque electrode is used for the signal electrode formed below the reflective electrode, as in the second embodiment.

While the foregoing embodiment has illustrated the structure of reflection/transmission combined type picture character display window 7, a transmission type liquid crystal display element can also be formed, for example, when each of picture character pixel electrode 21 and background pixel electrode 23 are comprised only of a transparent electrode.

(Third Embodiment)

A third embodiment shows an exemplary liquid crystal display device which employs a reflection type liquid crystal display element for matrix display window 6 illustrated in FIG. 1. First, the structure of reflection type matrix display window 6 will be described with reference to FIGS. 5A, 5B.

Figure 5A:
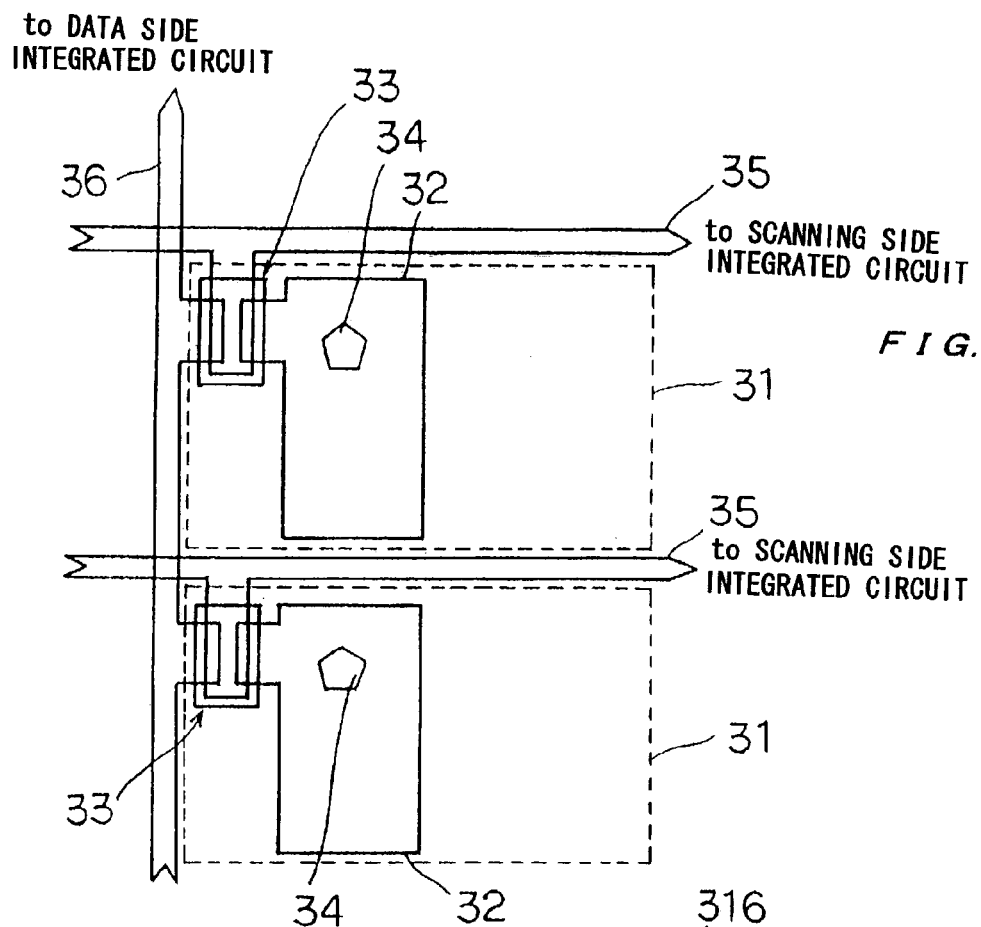
FIG. 5A is a top plan view illustrating the configuration of a matrix display window in a reflection type liquid crystal display element according to a third embodiment of the present invention.

As illustrated in FIG. 5A, matrix display window 6 in the third embodiment comprises matrix pixel electrodes 31 formed on element substrate 1 and arranged in a lattice pattern; matrix signal electrode 32 formed below each matrix pixel electrode 31 across an insulating layer, not shown; thin film transistor 33 which uses matrix signal electrode 32 for a source electrode; and contact hole 34 for connecting matrix pixel electrode 31 to matrix signal electrode 32.

Thin film transistor 33 has a gate electrode connected to scanning side integrated circuit 5 through gate wire 35, and a drain electrode connected to data side integrated circuit 4 through drain wire 36. Gate wire 35 and drain wire 36 are routed in different layers and intersect at right angles, so that matrix pixel electrode 31 is formed in a pixel area surrounded by these wires.

Figure 5B:
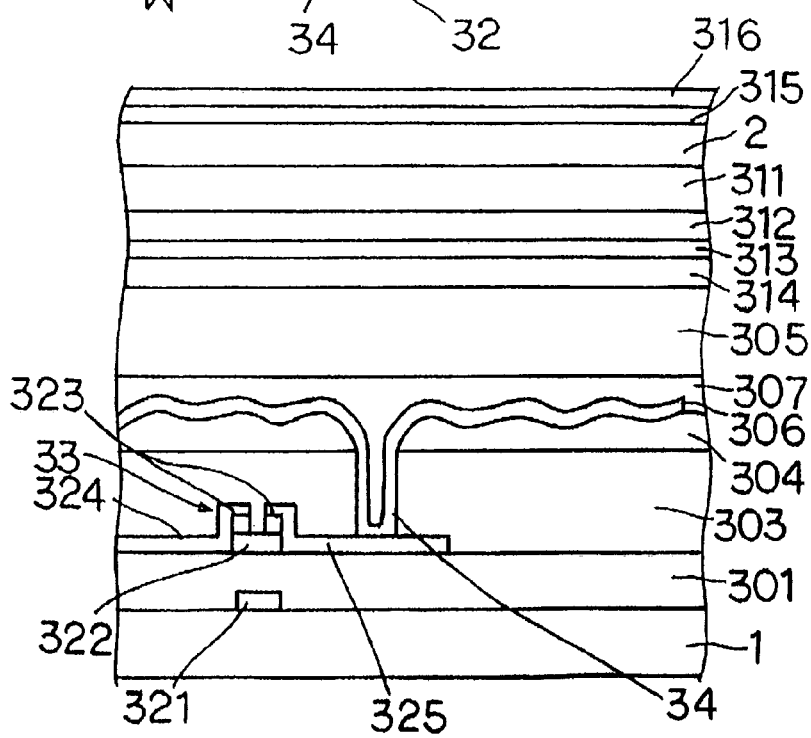
FIG. 5B is a cross-sectional view of the matrix display window illustrated in FIG. 5A.

As illustrated in FIG. 5B, gate electrode 321 is formed on element substrate 1 of matrix display window 6, and insulating film 301 made of silicon nitride or the like is deposited on element substrate 1 to overlay gate electrode 321. A-Si (amorphous silicon) layer 322 and $n^+$-type a-Si layer 323 are formed in each pixel area on insulating film 301, and drain electrode 324 and source electrode 325 of thin film transistor 33 are each formed on $n^+$-type a-Si layer 323. Source electrode 325 serves as the aforementioned matrix signal electrode 32. Thin film transistor 33 is covered with interlayer insulating film 303 and rugged insulating film 304. Reflective electrode 306 is formed on rugged insulating film 304 for reflecting external light and for applying a voltage to liquid crystal layer 305 sandwiched between element substrate 1 and common substrate 2. Reflective electrode 306 serves as the aforementioned matrix pixel electrode 31. Reflective electrode 306 is formed with a rugged surface, where the pitch, height and depth of ruggedness are respectively set to provide desired reflection optical characteristics.

Interlayer insulating film 303 and rugged insulating film 304 are provided with contact hole 34 extending therethrough, such that source electrode 325 is connected to reflective electrode 306 through contact hole 34. Alignment film 307 is formed on reflective electrode 306 for orienting liquid crystal molecules in contact with liquid crystal layer 305 in a predetermined direction.

On the other hand, on common substrate 2 which opposes element substrate 1 across liquid crystal layer 305, a laminate is comprised of, color filters 311 for display in color; protection film 312 for protecting color filters 311; common electrode 313 made of a transparent ITO (Indium Tin Oxide) film; and alignment film 314. These components are stacked in this order. In addition, phase difference plate 315 and polarizer plate 316 are laminated in order on the back of common substrate 2 opposite to liquid crystal layer 305.

The reflection type matrix display window in the third embodiment is identical in laminate structure to reflection type picture character display window 7 shown in the first embodiment except for the respective components of thin film transistor 33. Therefore, when the liquid crystal display device illustrated in FIG. 1 is designed to comprise matrix display window 6 illustrated in the third embodiment and picture character display window 7 illustrated in the first embodiment, the matrix display window and picture character display window can be manufactured in the same process, thereby reducing the manufacturing cost.

Also, in the strategy as mentioned above, the same reflective electrode having the same ruggedness pitch, height and depth can be commonly used for the matrix display window and picture character display window, and moreover these display units can be formed with contact holes which have the same diameter and are arranged at the same pitch. It is therefore possible to match the two display units in the reflection optical characteristics to provide the same display quality both on the picture character display window and matrix display window. Particularly, the current consumption can be reduced in the overall liquid crystal display device by using the reflection type matrix display window and picture character display window.

The picture character display window can also provide an equivalent display quality to the matrix display window when the picture character display window is configured in the same manner as the matrix display window which is actively driven using thin film transistors. However, in the third embodiment, the picture character display window is statically driven to provide a display quality substantially equivalent to the matrix display window, so that the power consumption can be reduced as compared with the foregoing liquid crystal display device which employs the actively driven picture character display window.

Also, the reflection type matrix display window illustrated in the third embodiment and the transmission type picture character display window illustrated in the second embodiment may be used to design a liquid crystal display device which can provide uniform display characteristics such as color tone, contrast, viewing angle and the like in both display units because they are substantially the same in laminate structure.

(Fourth Embodiment)

A fourth embodiment shows an exemplary liquid crystal display device which employs a reflection/transmission combined type liquid crystal display element which partially transmits a and partially reflects light for the matrix display window illustrated in FIG. 1. The following description will be first made on the structure of the reflection/transmission combined type liquid matrix display window with reference to FIGS. 6A, 6B.

Figure 6A:
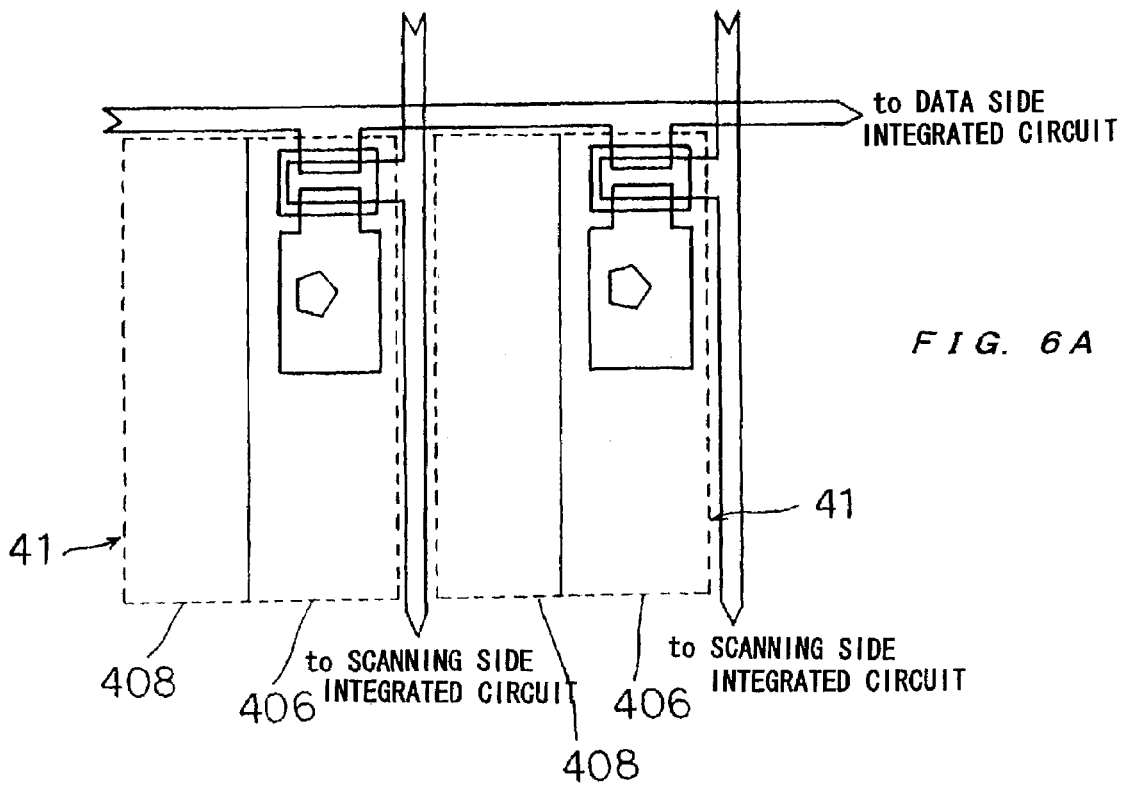
FIG. 6A is a top plan view illustrating the configuration of a matrix display window in a reflection/transmission combined type liquid crystal display element according to a fourth embodiment of the present invention.

As illustrated in FIG. 6A, the matrix display window in the fourth embodiment differs from the third embodiment in that matrix pixel electrode 41 is comprised of reflective electrode 406 which occupies a predetermined space in each pixel area, and transparent electrode 408 connected to reflective electrode 406 in the same layer.

Figure 6B:
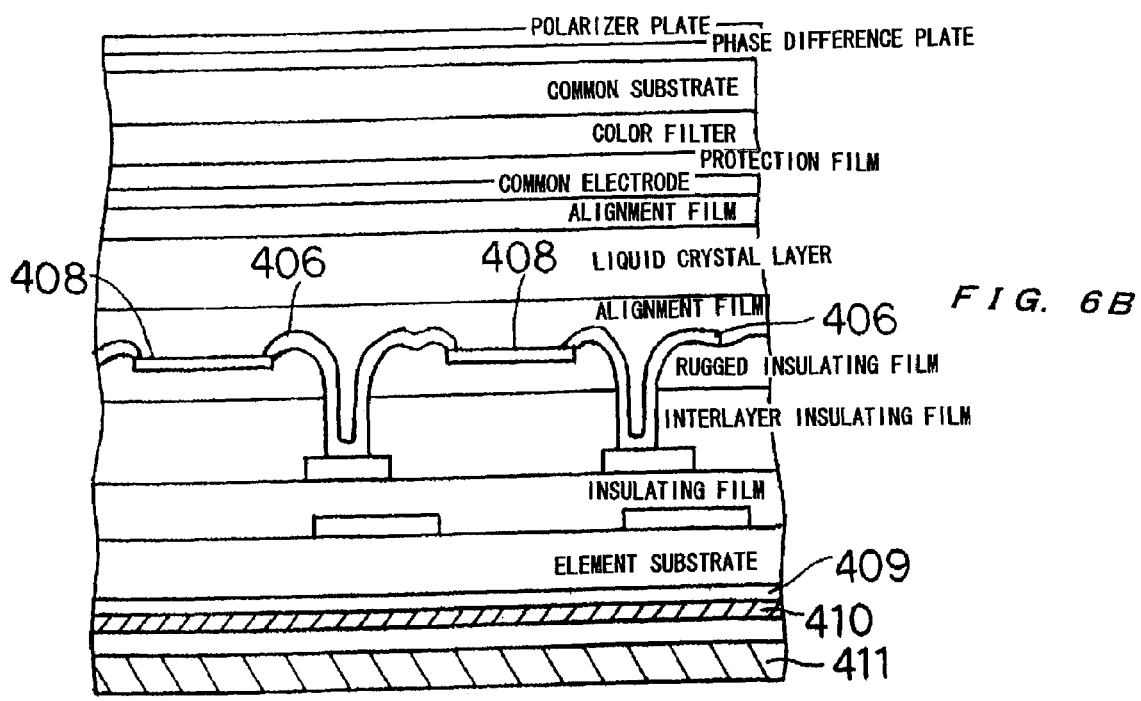
FIG. 6B is a cross-sectional view of the matrix display window illustrated in FIG. 6A.

Also, as illustrated in FIG. 6B, since the matrix display window in the fourth embodiment is of the reflection/transmission combined type, phase difference plate 409 and polarizer plate 410 are laminated in order on the back of element substrate 1 opposite to liquid crystal layer 405, with backlight 411 disposed below polarizer plate 410. Since the remaining configuration is similar to the third embodiment, description thereon is omitted.

The matrix display window in the fourth embodiment has the same laminate structure as the reflection/transmission combined type picture character display window illustrated in the second embodiment except for the respective components of thin film transistors 33. Therefore, when the liquid crystal display device illustrated in FIG. 1 is designed to comprise the matrix display window illustrated in the fourth embodiment and the picture character display window illustrated in the second embodiment, the matrix display window and picture character display window can be manufactured in the same process, thereby reducing the manufacturing cost. In addition, since the matrix display window and picture character display window have the same laminate structure so that they can use common contact holes having the same diameter and arranged at the same pitch, it is possible to match both display units in the transmission optical characteristics to provide the same display quality both for the picture character display window and matrix display window.

Further, since the picture character display window is statically driven to provide a display quality substantially equivalent to that of the matrix display window, the power consumption can be reduced as compared with a picture character display window which is configured in the same manner as the matrix display window.

Also, the reflection/transmission combined type matrix display window illustrated in the fourth embodiment and the reflection type picture character display window illustrated in the first embodiment may be used to design a liquid crystal display device which can provide uniform display characteristics such as color tone, contrast, viewing angle and the like in both display units because they are substantially the same in laminate structure. Particularly, the current consumption can be reduced in the overall liquid crystal display device by using the reflection type picture character display window.

While matrix pixel electrode 41 employed in the matrix display window in the fourth embodiment is a translucent reflective electrode which partially transmits and partially reflects light, matrix pixel electrode 41 may be implemented by a so-called half mirror structure as is the case with the second embodiment. In addition, either the reflective electrode or the transparent electrode, making up matrix pixel electrode 41, may be larger than the other, and the contact hole may be provided in any of the reflective electrode and transparent electrode.

While the foregoing embodiment has illustrated the structure of the reflection/transmission combined type picture character display window, a transmission type liquid crystal display element can also be formed when matrix pixel electrode 41 is comprised only of a transparent electrode.

(Fifth Embodiment)

Figure 7:
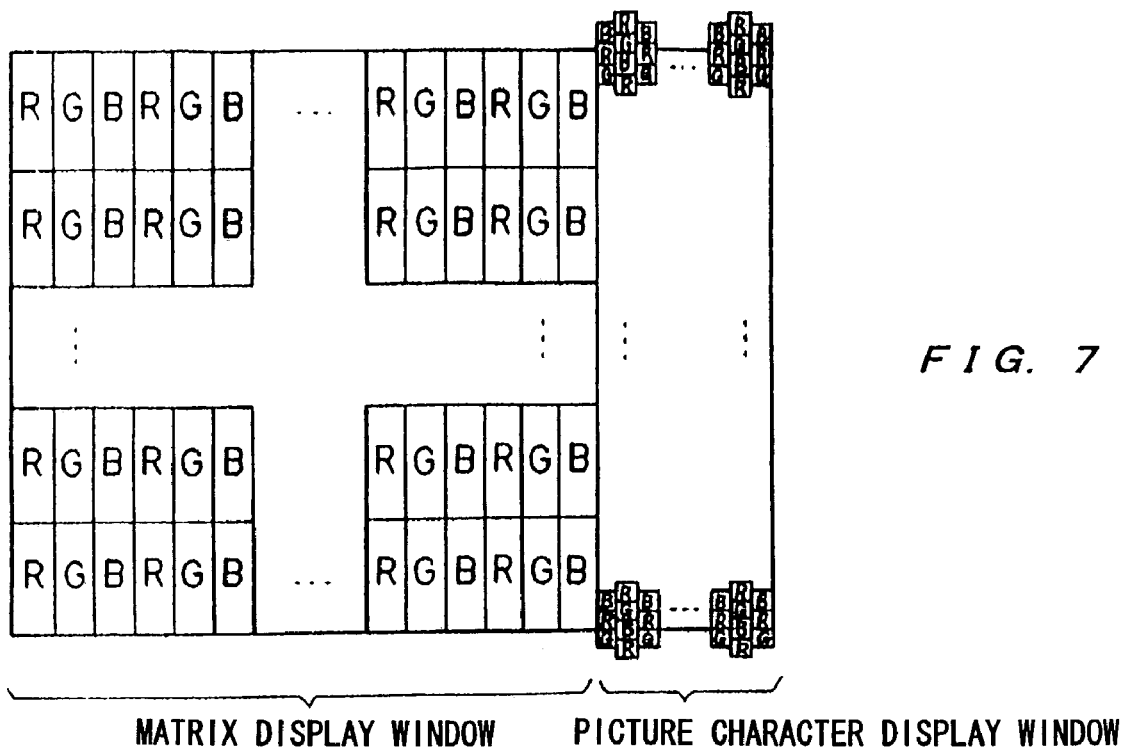
FIG. 7 is a top plan view illustrating an exemplary layout of color filters formed on a common substrate of the liquid crystal display device illustrated in FIG. 1.
Figure 8:
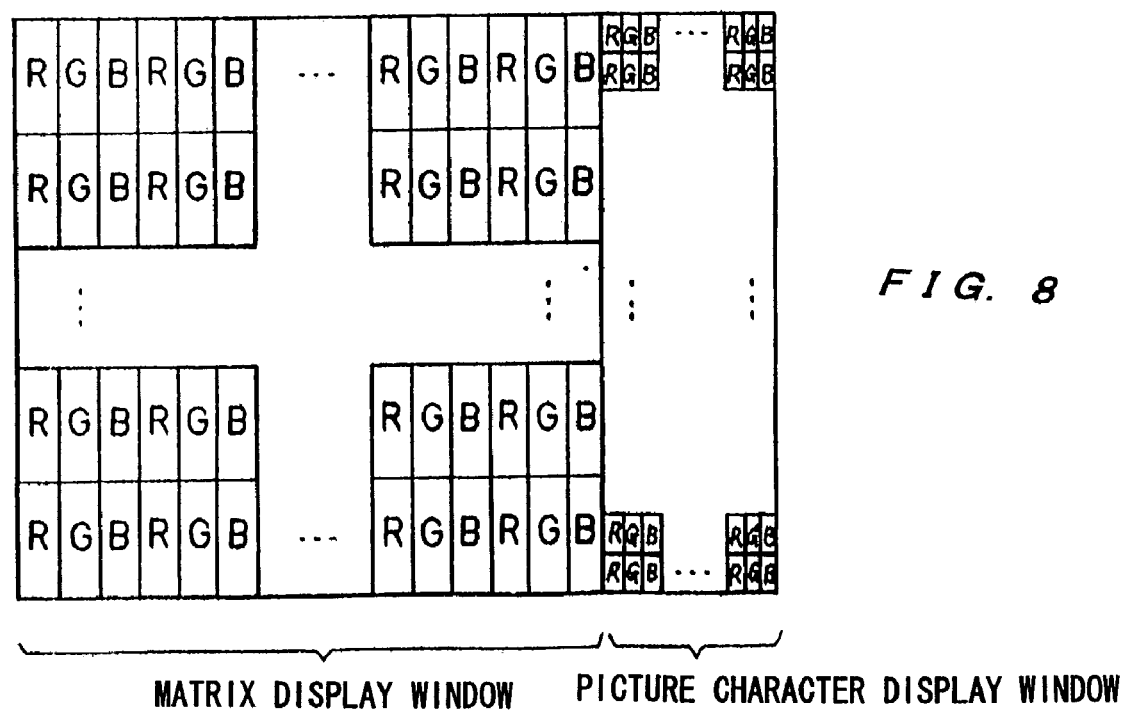
FIGS. 8 and 9 are top plan views each illustrating another exemplary layout of the color filters formed on the common substrate of the liquid crystal display device illustrated in FIG. 1.
Figures 9, 10:
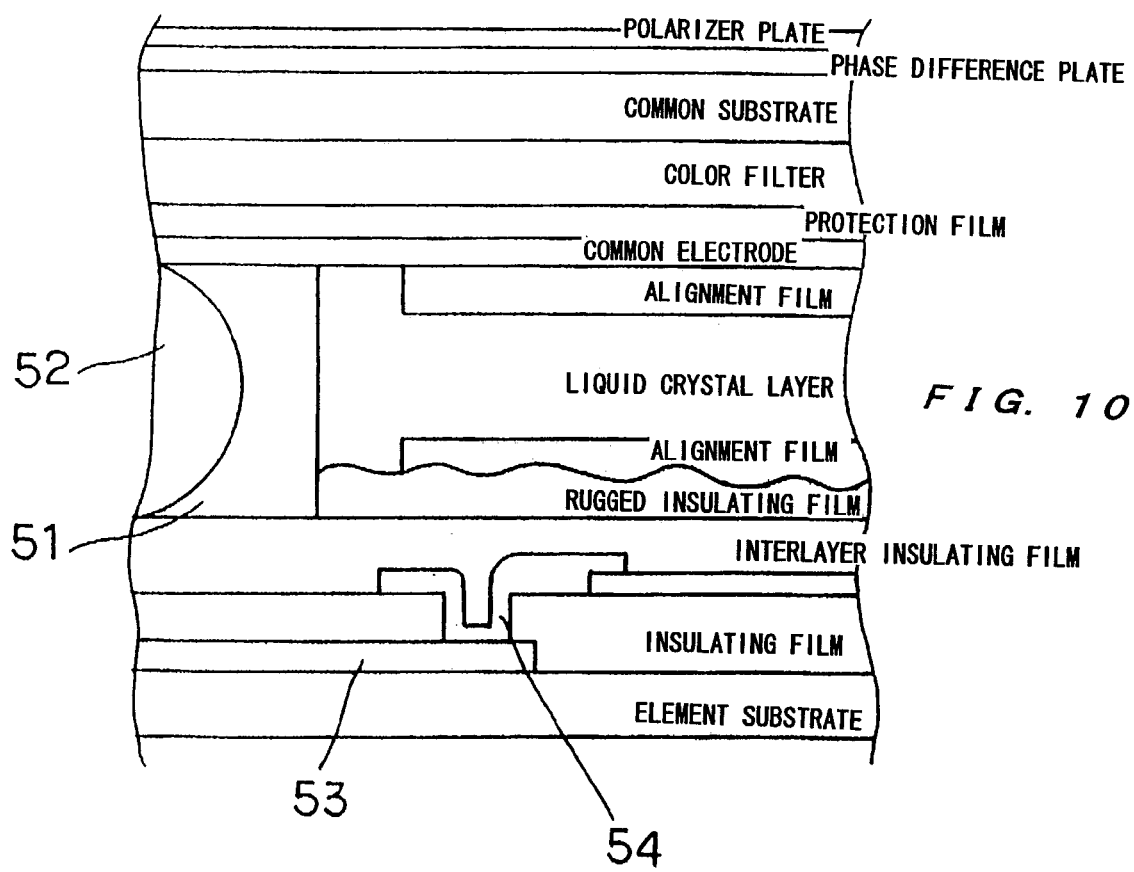
FIG. 10 is a cross-sectional view illustrating an exemplary configuration of a seal in the liquid crystal display device illustrated in FIG. 1.

FIG. 7 is a top plan views illustrating an exemplary layout of color filters which are formed on the common substrate in the liquid crystal display device illustrated in FIG. 1. FIGS. 8 and 9 are top plan views each illustrating another exemplary layout of the color filters which are formed on the common substrate in the liquid crystal display device illustrated in FIG. 1.

The liquid crystal display device in the fifth embodiment has R(red), G(green), B(blue) color filters in the matrix display window formed in stripe geometry, and R, G, B color filters in the picture character display window formed in delta geometry. Alternatively, as illustrated in FIG. 8, the R, G, B color filters in the matrix display window are formed in stripe geometry, while the R, G, B color filters in the picture character display window are formed also in stripe geometry. Further alternatively, instead of the layout illustrated in FIG. 7 or 8, the R, G, B color filters may be formed in mosaic geometry in the picture character display window as illustrated in FIG. 9.

In the fifth embodiment, the color filters arranged in the matrix display window are made to have at least one of a vertical and a horizontal cell pitch longer than a corresponding cell pitch of the color filters arranged in the picture character display window. Specifically, the color filters in the picture character display window have a cell pitch one third as long as those in the matrix display window. By thus arranging the color filters in the picture character display window at the cell pitch shorter than those in the matrix display window, the display quality is improved particularly when oblique lines are displayed on the picture character display window.

It should be noted that in the present invention, the picture character display window basically displays in black and white, so that it is not necessary to selectively drive pixels, each assigned to one of R, G, B colors in the picture character display window, as is the case in the matrix display window. Instead, a need exists only for simultaneously using all color filters which are laid out corresponding to the picture character pixel electrode formed in the shape of a desired picture character.

In the foregoing embodiments described above, the color filters in the matrix display window are formed in stripe geometry, while the color filters in the picture character display window are formed in delta, stripe or mosaic geometry. Alternatively, the matrix display window may be comprised of color filters formed in delta or mosaic geometry depending on particular types of displayed images.

In this way, when color filters are provided not only in the matrix display window for color display but also in the picture character display window for monochrome display, color tone can be matched in both display units.

In the aforementioned first to fourth embodiments, no particular description has been made on a method of routing wires between data side integrated circuit 4 and the picture character signal electrode, background signal electrode and matrix signal electrode. For example, when liquid crystal is enclosed between element substrate 1 and common substrate 2 and seal 51 is provided with Au ball 52 for supplying a predetermined voltage to the common electrode, the wires are preferably passed through different wiring layers halfway for connection with data side integrated circuit 4 through a signal electrode.

For example, when the signal electrodes (picture character signal electrode and background signal electrode) on the insulating layer illustrated in FIG. 2 are connected to an external data side integrated circuit using the existing layers as they are, the insulation can fail because there is only the interlayer insulating film between Au ball 52 and the signal electrodes.

As illustrated in FIG. 10, in the liquid crystal display device according to the present invention, signal wire (signal electrode) 53 connected to data side integrated circuit 4 is formed on element substrate 1 in a non-display area, and contact hole 54 is formed through the insulating film in a display area for connecting the signal electrode on the insulating film to signal wire 53 on element substrate 1 through contact hole 54.

With the connection as described above, the insulating property is improved between signal wire 53 and Au ball 52 because the interlayer insulating film as well as insulating film exist between signal wire 53 and Au ball 52, thereby preventing a failure in insulation.

While FIG. 10 illustrates two insulating films through which the signal electrode is connected to the data side integrated circuit in the reflection type picture character display window illustrated in the first embodiment, given as an example, a similar advantage can be provided as well in the transmission type picture character display window, reflection type matrix display window, and transmission type matrix display window illustrated in the second to fourth embodiments if the signal electrode is connected to the data side integrated circuit through a signal wire which passes through the interlayer insulating film and insulating film.

While preferred embodiments of the present invention have been described using specific terms, such description is for illustrative purposes only, and it is to be understood that changes and variations may be made without departing from the spirit or scope of the following claims.

What is claimed is:

1. A liquid crystal display device, comprising:
a first substrate including a picture character pixel electrode for displaying a picture character represented by a fixed pattern, an interlayer insulating film having a reflective electrode formed thereon, said reflective electrode being formed into said picture character pixel electrode, said interlayer insulating film having a plurality of first contact holes, a picture character signal electrode formed below said interlayer insulating film for connection to said picture character pixel electrode through said plurality of first contact holes, a background pixel electrode disposed around a periphery of said picture character pixel electrode, and a background signal electrode connected to said background pixel electrode through a plurality of second contact holes, wherein said picture character pixel electrode and said picture character signal electrode are disposed in different layers, and said background pixel electrode and said background signal electrode are disposed in different layers, and wherein said plurality of first contact holes are disposed within said periphery of said picture character pixel electrode and said plurality of second contact holes are disposed outside of said periphery;

a second substrate formed with a common electrode opposite to said picture character pixel electrode; and a liquid crystal layer sandwiched between said first substrate and said second substrate.

2. The liquid crystal display device according to claim 1, wherein said first contact holes have a size which is not visible to an unaided human eye.

3. The liquid crystal display device according to claim 1, wherein said contact holes have a diameter of 29 μm or less.

4. The liquid crystal display device according to claim 1, wherein said first contact holes are formed at predetermined intervals.

5. The liquid crystal display device according to claim 1, wherein said first contact holes are formed at locations a predetermined distance or more away from the periphery of said picture character pixel electrode within said picture character pixel electrode.

6. The liquid crystal display device according to claim 1, wherein a portion of said picture character signal electrode that is not covered with said picture character pixel electrode, said background pixel electrode or a light shielding film has a width of less than or equal to approximately 29 μm.

7. The liquid crystal display device according to claim 1, wherein said picture character pixel electrode is statically driven.

8. The liquid crystal display device according to claim 1, wherein said picture character pixel electrode is a reflective electrode.

9. The liquid crystal display device according to claim 1, wherein said picture character pixel electrode is a transparent electrode.

10. The liquid crystal display device according to claim 1, wherein said picture character pixel electrode is a translucent reflective electrode which partially transmits and partially reflects light.

11. The liquid crystal display device according to claim 10, wherein said translucent reflective electrode includes:

a first reflective electrode; and a first transparent electrode connected to said first reflective electrode in the same layer, at least one of said first reflective electrode and said first transparent electrode being connected to said first contact hole.

12. The liquid crystal display device according to claim 1, wherein said first substrate comprises:

a plurality of matrix pixel electrodes arranged on said interlayer insulating film in a lattice pattern for displaying a desired image; and a matrix signal electrode formed below said interlayer insulating film and connected to said matrix pixel electrode through said plurality of second contact holes, said matrix signal electrode having one end connected to a thin film transistor.

13. The liquid crystal display device according to claim 12, wherein said first contact holes and said second contact holes are substantially identical in shape, and are arranged at the same intervals.

14. The liquid crystal display device according to claim 12, further comprising:

color filters arranged in stripe geometry in an area of said second substrate opposite to said matrix pixel electrode; and color filters arranged in delta geometry in an area of said second substrate opposite to said picture character pixel electrode.

15. The liquid crystal display device according to claim 14, wherein said color filters arranged in the area opposite to said matrix pixel electrode have a vertical and a horizontal cell pitch, at least one of which is longer than a corresponding cell pitch of the color filters arranged in the area opposite to said picture character pixel electrode.

16. The liquid crystal display device according to claim 12, further comprising:

color filters arranged in stripe geometry in an area of said second substrate opposite to said matrix pixel electrode; and color filters arranged in stripe geometry in an area of said second substrate opposite to said picture character pixel electrode.

17. The liquid crystal display device according to claim 16, wherein said color filters arranged in the area opposite to said matrix pixel electrode have a vertical and a horizontal cell pitch, at least one of which is longer than a corresponding cell pitch of the color filters arranged in the area opposite to said picture character pixel electrode.

18. The liquid crystal display device according to claim 12, further comprising:

color filters arranged in stripe geometry in an area of said second substrate opposite to said matrix pixel electrode; and color filters arranged in mosaic geometry in an area of said second substrate opposite to said picture character pixel electrode.

19. The liquid crystal display device according to claim 18, wherein said color filters arranged in the area opposite to said matrix pixel electrode have a vertical and a horizontal cell pitch, at least one of which is longer than a corresponding cell pitch of the color filters arranged in the area opposite to said picture character pixel electrode.

20. The liquid crystal device according to claim 12, wherein said picture character pixel electrode is statically driven.

21. The liquid crystal display device according to claim 12, wherein:

said thin film transistor is driven by a scanning signal supplied to a gate electrode and a data signal supplied to a drain electrode; and said scanning signal is deactivated in a power save mode to stop a display through said matrix pixel electrode.

22. The liquid crystal display device according to claim 12, wherein:

said picture character signal electrode is formed in the same layer as a source electrode of said thin film transistor which serves as said matrix signal electrode in a display area, and formed in the same layer as the gate electrode of said thin film transistor in a non-display area.

23. The liquid crystal display device according to claim 12, wherein said picture character pixel electrode is a reflective electrode.

24. The liquid crystal display device according to claim 12, wherein said picture character pixel electrode is a reflective electrode.

at least one of said first reflective electrode and said first transparent electrode being connected to said first contact hole.

25. The liquid crystal display device according to claim 12, wherein said picture character pixel electrode is a translucent reflective electrode which partially transmits and partially reflects light.

26. The liquid crystal display device according to claim 25, wherein said translucent reflective electrode includes:

a first reflective electrode; and a first transparent electrode connected to said first reflective electrode in the same layer, at least one of said first reflective electrode and said first transparent electrode being connected to said first contact hole.

27. The liquid crystal display device according to claim 12, wherein said matrix pixel electrode is a reflective electrode.

28. The liquid crystal display device according to claim 12, wherein said matrix pixel electrode is a transparent electrode.

29. The liquid crystal display device according to claim 12, wherein said matrix pixel electrode is a translucent reflective electrode which partially transmits and partially reflects light.

30. The liquid crystal display device according to claim 29, wherein said translucent reflective electrode includes:

a second reflective electrode; and a second transparent electrode connected to said second reflective electrode in the same layer, at least one of said second reflective electrode and said second transparent electrode being connected to said second contact hole.

31. The liquid crystal display device according to claim 12, wherein:

each of said picture character pixel electrode and said matrix pixel electrode is a reflective electrode, and said picture character pixel electrode is equal in reflection optical characteristics to said matrix pixel electrode.

* * * * *